United States Patent [19]

Varin et al.

[11] Patent Number: 4,574,922
[45] Date of Patent: Mar. 11, 1986

[54] PIN ASSEMBLY FOR A CALIPER DISC BRAKE

[75] Inventors: James D. Varin, Royal Oak; H. Vincent Fromm, Madison Heights; Henry W. McClelland, West Bloomfield, all of Mich.

[73] Assignee: Ford Motor Company, Dearborn, Mich.

[21] Appl. No.: 430,296

[22] Filed: Sep. 30, 1982

[51] Int. Cl.⁴ .............................................. F16D 65/02
[52] U.S. Cl. .............................. 188/73.35; 188/73.45
[58] Field of Search ............... 188/73.31, 73.35, 73.43, 188/73.45, 73.46, 73.36; 267/140.3, 140.4, 151, 152; 192/106.1, 106.2

[56] References Cited

U.S. PATENT DOCUMENTS

| | | | |
|---|---|---|---|
| 3,616,876 | 11/1971 | Brooks | 188/73.45 |
| 3,648,807 | 3/1972 | Lottridge et al. | 188/73.35 |
| 3,997,034 | 12/1976 | Kellogg | 188/73.45 |
| 4,042,074 | 8/1977 | Ishihara | 188/73.45 |
| 4,084,665 | 4/1978 | Burnett | 188/73.45 |
| 4,144,952 | 3/1979 | Nakayama | 188/73.45 |
| 4,200,173 | 4/1980 | Evans et al. | 188/73.45 |
| 4,244,451 | 1/1981 | Johannesen | 188/73.45 |
| 4,267,904 | 5/1981 | Belart | 188/73.45 |
| 4,310,075 | 1/1982 | Johannesen et al. | 188/73.45 |
| 4,393,963 | 7/1983 | Oltmanns, Jr. et al. | 188/73.45 |
| 4,418,798 | 12/1983 | Johannesen et al. | 188/73.45 |
| 4,448,289 | 5/1984 | Gumkowski et al. | 188/73.45 |

FOREIGN PATENT DOCUMENTS

| | | | |
|---|---|---|---|
| 1434349 | 2/1966 | France | 267/152 |
| 2249574 | 5/1975 | France | 188/73.43 |

*Primary Examiner*—Bruce H. Stoner, Jr.
*Assistant Examiner*—Richard R. Diefendorf
*Attorney, Agent, or Firm*—Peter D. McDermott; Roger L. May

[57] ABSTRACT

A disc brake assembly has a floating caliper interposed between two arms of a torque member. The caliper is mounted between the arms by two pin assemblies. Each pin assembly includes a radially compressible cylindrical sleeve substantially filled with elastomeric material and installed within an aperture formed by opposing slots within each of the torque member arms and caliper. The pin assembly has a first resilient rate when contracting from an unflexed position to a radially contracted second position which allows it to be fitted through the aperture. The pin assembly has a higher resilient rate when contracting from the second position to a further contracted third position.

9 Claims, 11 Drawing Figures

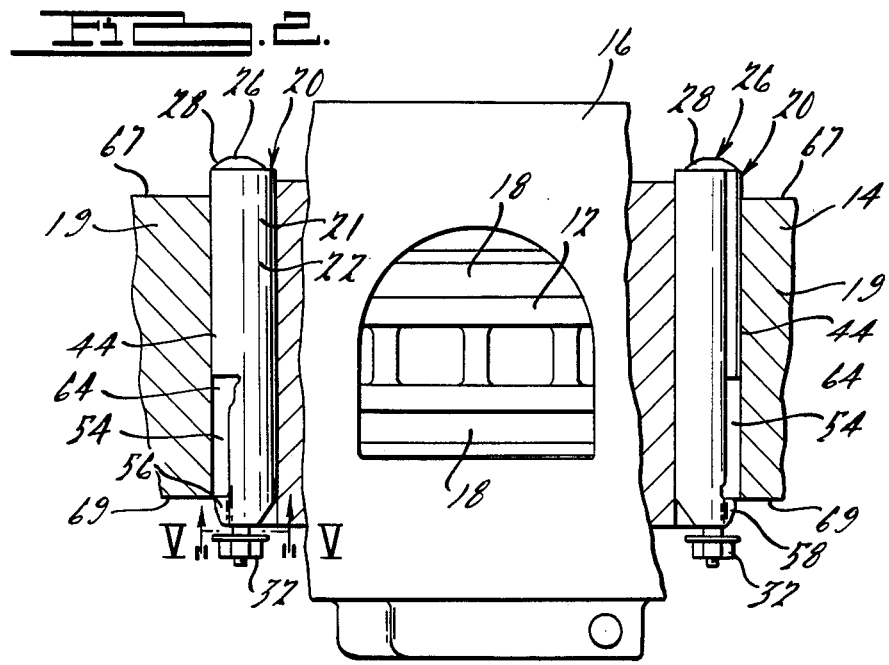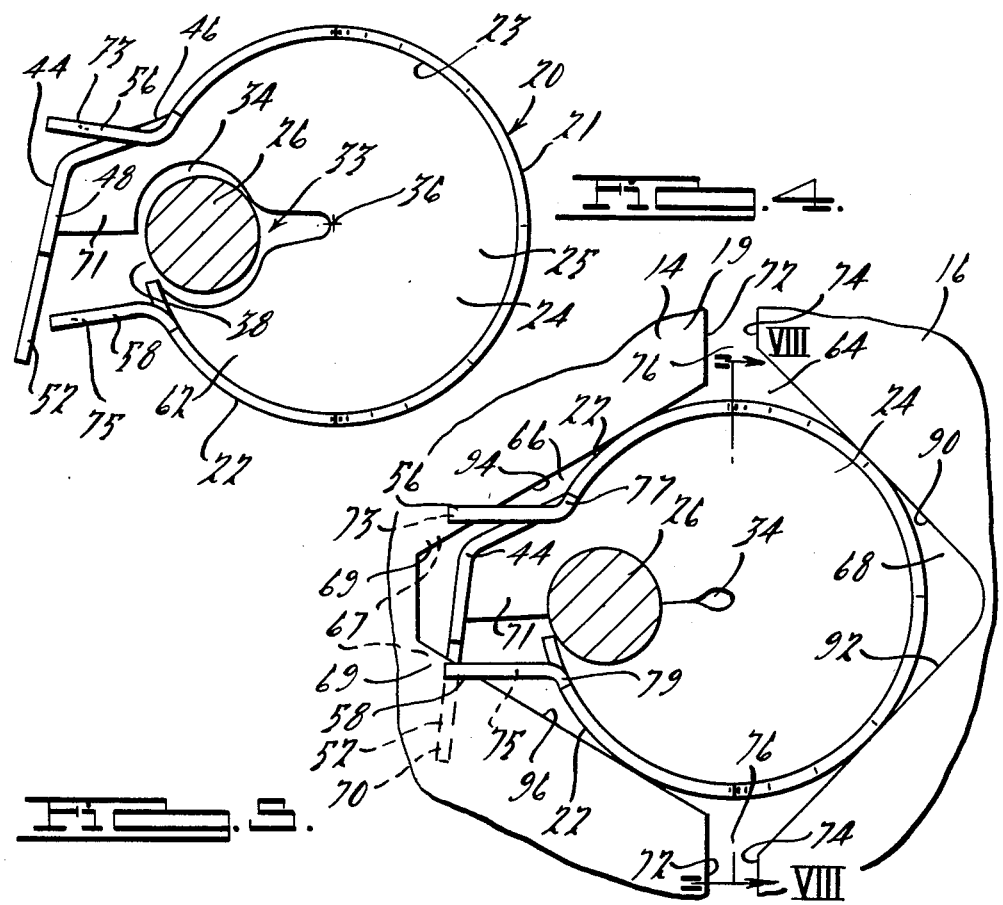

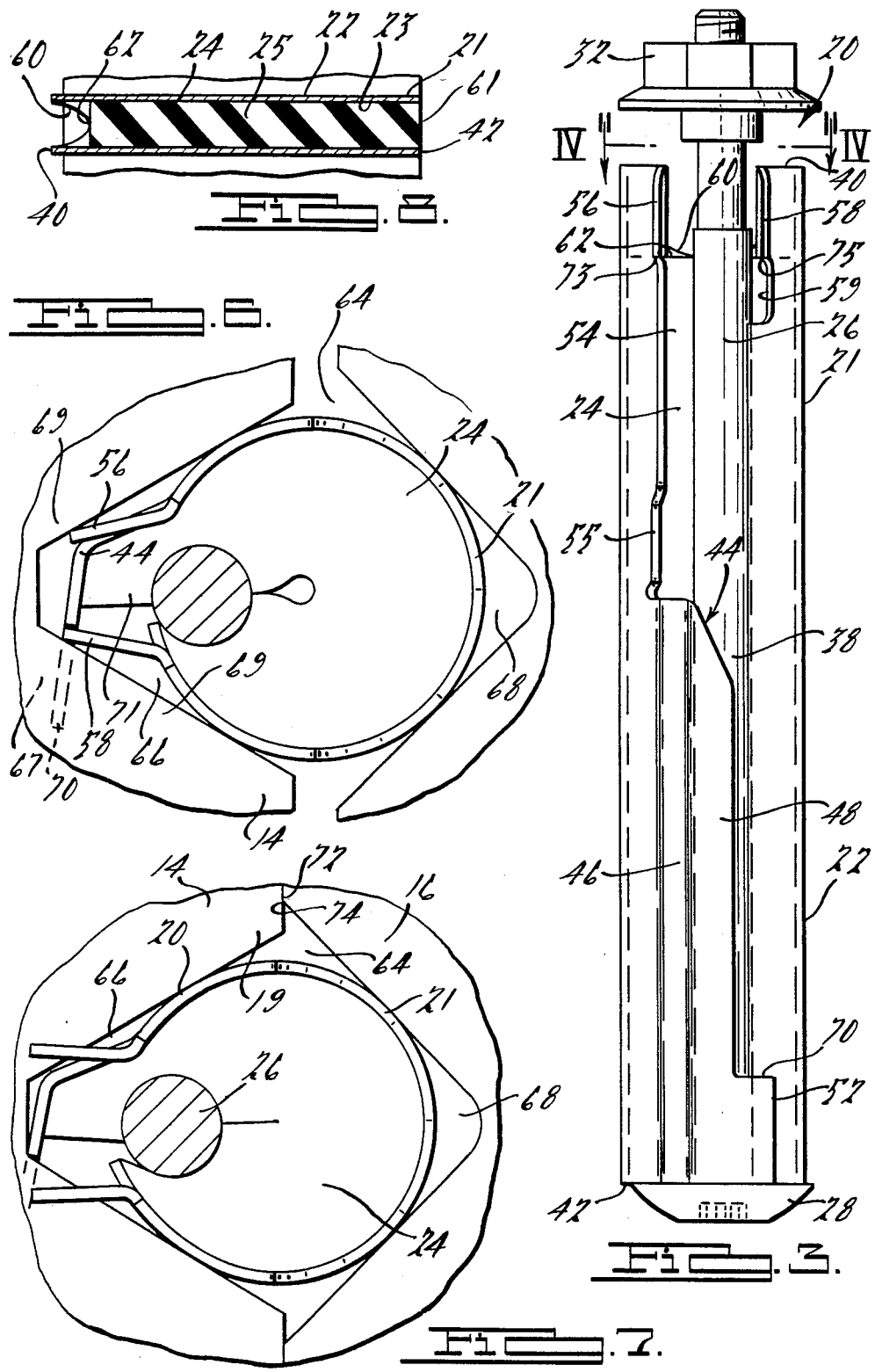

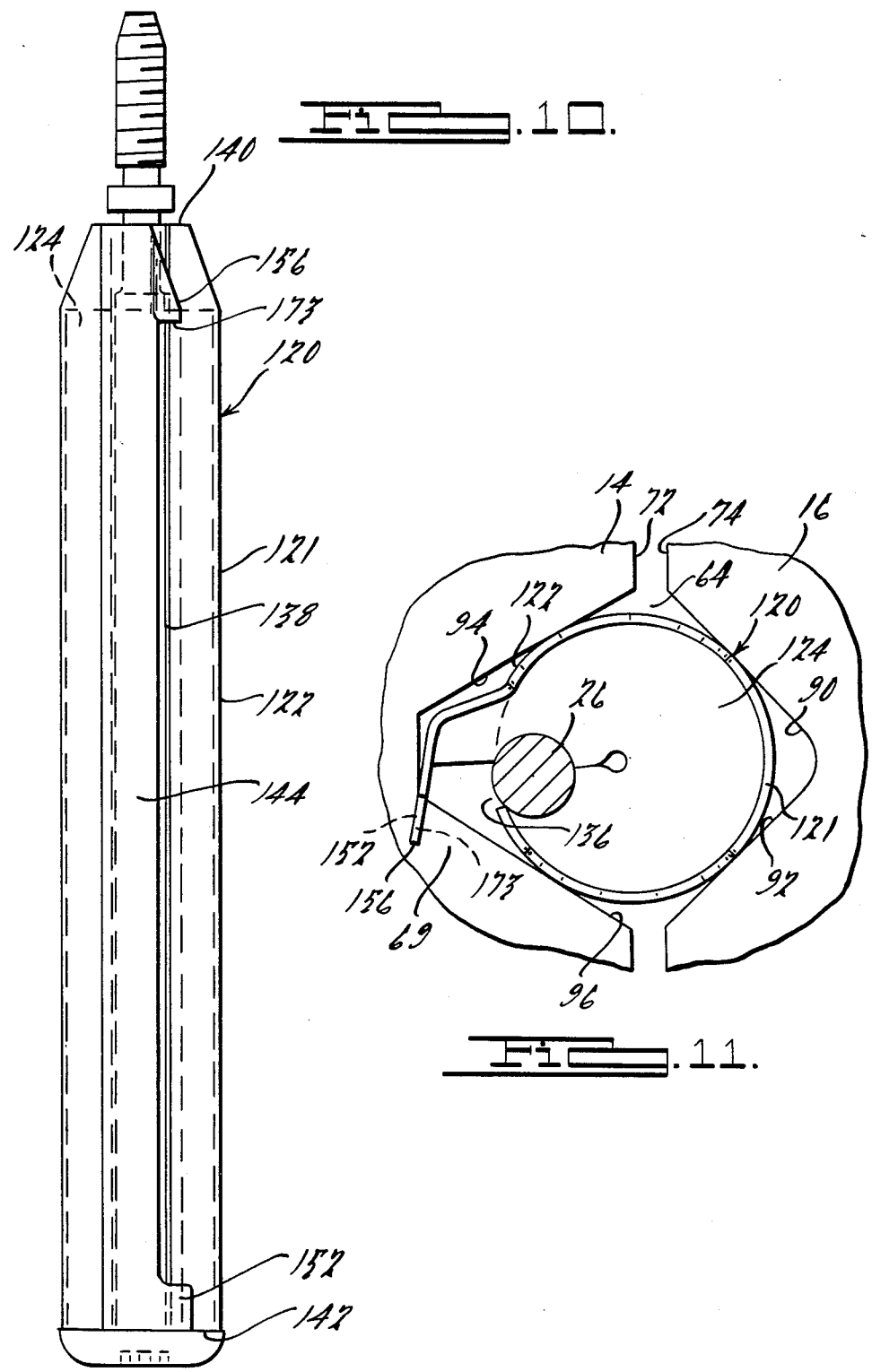

PIN ASSEMBLY FOR A CALIPER DISC BRAKE

TECHNICAL FIELD

This invention relates to caliper disc brakes and, more particularly, to a pin assembly mounting a caliper onto a torque member.

BACKGROUND DISCLOSURE INFORMATION

Floating caliper disc brakes are known to have advantages over nonfloating calipers. The opposing sides of a floating caliper and a torque member need not be machined smooth because the caliper no longer has to slide against the torque member. However, a guide and retention mechanism must retain the caliper between two arms of the torque member and guide the caliper when the brakes are actuated. Commonly, a pin assembly is interposed between the caliper and each arm of the torque member. Some floating caliper disc brake assemblies have the torque exerted from the caliper transfer through the pin assembly to the torque member. Consequently, the pin assembly must be constructed strong enough to withstand the torque transfer. Other floating caliper disc brake assemblies have the caliper transfer braking torque directly to the torque member thereby bypassing the pin assembly. In order to have this direct torque transfer, the pin assembly is deformable. Known deformable pin assemblies either have exterior elastomeric bushings which are subject to heavy wear due to the sliding motion of the caliper against the bushing, or are difficult to assemble within the space provided between the torque member and caliper.

It is desired to have a pin assembly which is durable and yet easy to install while maintaining the known advantages of a floating caliper disc brake.

SUMMARY OF THE INVENTION

In accordance with the invention, the disc brake assembly includes a rotor, a torque member positioned adjacent the rotor, and a caliper. The caliper mounts friction elements for engagement with the rotor. Two pin assemblies support the caliper between two arms of the torque member. Each arm and the caliper have slots opposing each other to form apertures, each receiving one of the pin assemblies.

Each pin assembly includes a resiliently flexible sleeve having a cylindrical portion with an axial extending slit. The cylindrical portion has an inner facing surface defining a bore and being bonded to elastomeric material. The elastomeric material substantially fills a major portion of the bore and defines the boundaries of an axial extending cleft therein. A rod axially passes through the cleft in the elastomeric material. A void is formed between the elastomeric material and the rod when the sleeve is in an unflexed first position.

The sleeve is resiliently flexible from the unflexed first position to a radially contracted second position. In this contracted second position, the sleeve is sized to fit within the aperture. In addition, the elastomer abuts the rod thereby substantially eliminating the void. A first end of the sleeve has a tang which radially extends outward. At the second end of the sleeve, a prong radially extends outwardly. The tang is in a deflected radially inward position to fit within the aperture. When the tang is so positioned, the sleeve can then axially be inserted through the aperture until the tang exists the other end of the aperture. The tang is then moved radially outward. The prong and tang engage two opposite surfaces of the torque member to axially affix the pin assembly within the aperture.

The sleeve has its cylindrical portion abut walls of the aperture. The sleeve also has a shoulder section radially extending from the cylindrical portion. The shoulder section abuts a radially extending wall of the aperture to prevent rotation of the pin assembly within the aperture.

The sleeve resiliently contracts from its second position to a radially contracted third position when the caliper laterally moves to decrease the lateral dimensions of the formed aperture and abuts the torque member. The resilient rate of the pin assembly from the contracted second position to the further contracted third position is substantially higher than the resilient rate from the first unflexed position to the contracted second position.

In broader terms, the invention relates to a disc brake assembly having a pin assembly constructed for being resiliently flexible in a radial direction from an unflexed first position to a radially contracted second position. The pin assembly also includes means for increasing the resilient rate from the contracted second position to a further contracted third position.

BRIEF DESCRIPTION OF THE DRAWINGS

Reference now will be made to the accompanying drawings in which:

FIG. 3 is an enlarged elevational view of the pin assembly shown in FIG. 2;

FIG. 4 is a further enlarged cross-sectional view taken along the lines IV—IV shown in FIG. 3;

FIG. 5 is an enlarged cross-sectional view taken the lines V—V shown in FIG. 2;

FIG. 6 is a view similar to FIG. 5 showing the pin assembly with its tangs in a deflected position;

FIG. 7 is a view similar to FIG. 5 showing the pin assembly when the caliper is in abutting relationship with the torque member;

FIG. 8 is a cross-sectional view taken along the lines VIII—VIII shown in FIG. 5;

FIG. 9 is a graph illustrating the force required for a specific amount of radial contraction of the pin assembly;

FIG. 10 is a view similar to FIG. 3 showing a second embodiment of a pin assembly; and FIG. 11 is a view similar to FIG. 5 showing the second embodiment.

DETAILED DESCRIPTION OF THE PREFERRED EMBODIMENT

Figure 1:
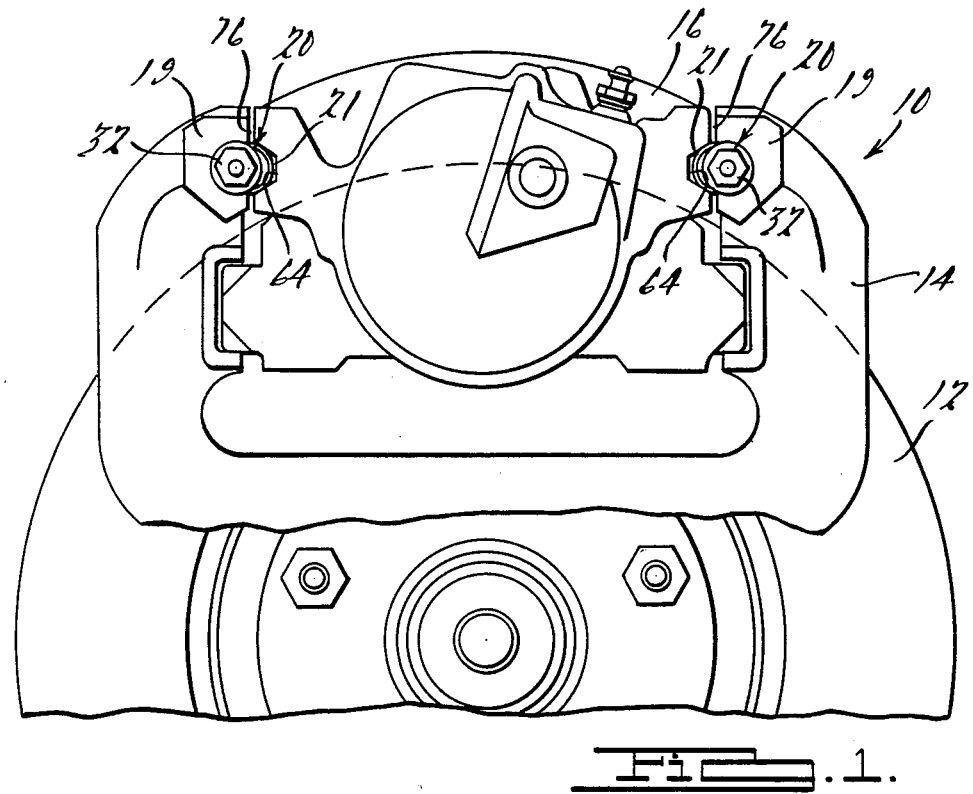
FIG. 1 is a side elevational view disclosing a disc brake assembly according to the invention.
Figure 2:
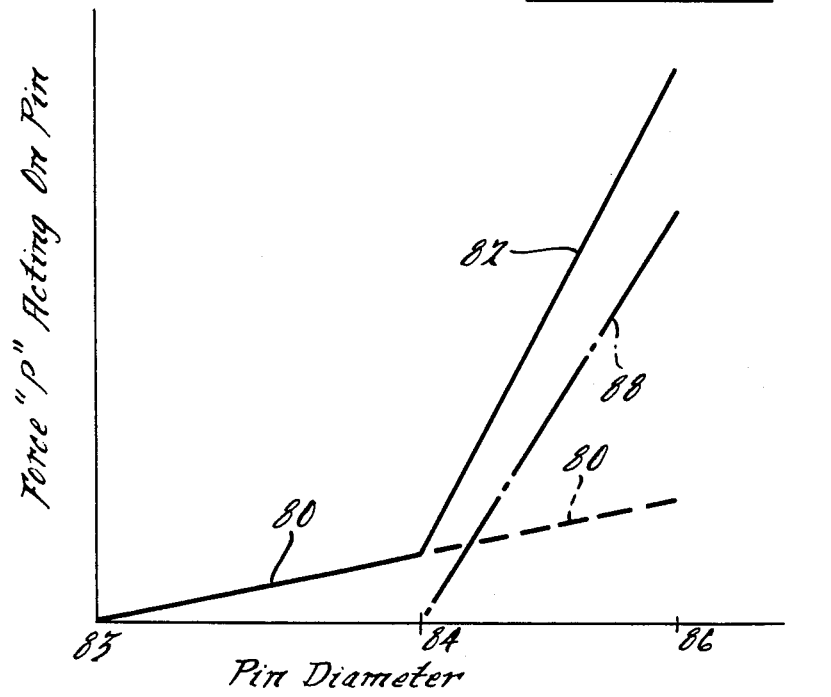
FIG. 2 is plan and partially segmented view of the disc brake assembly shown in FIG. 1.

Referring to FIGS. 1 and 2, a disc brake assembly 10 includes a rotor 12, a stationary torque member 14, and a caliper 16. The caliper 16 straddles the rotor 12 and has mounted thereto two brake pads 18 that are frictionally engageable to each side of the rotor. The caliper 16 is slidably mounted to two arms 19 of the torque member 14 via two pin assemblies 20.

Each pin assembly 20 is identical and, hence, only one pin assembly 20 is referred to unless otherwise indicated.

As shown in FIGS. 3 and 4, the pin assembly 20 comprises an outer spring steel sleeve 21 that has an axially extending slit 38 extending from one end 40 to another end 42. The sleeve 21 has a cylindrical portion 22. A wall section 46 extends from the cylindrical portion 22 and a second wall section 48 extends from wall section 46. Sections 46 and 48 form a shoulder 44. A prong 52 extends from wall section 48 at the end 42 of sleeve 21. At the midsection of the sleeve 21, the shoulder 44 ends and a cutaway 54 is formed which, in effect, widens the slit 38. The cutaway portion 54 has a length roughly three-fifths as long as the axial length of the shoulder 44. The cutaway portion has a further indented notch 55 immediately adjacent the end of shoulder 44. At end 40, two tangs 56 and 58 radially extend outwardly from cylindrical portion 22. The sleeve 21 has a notch 59 immediately adjacent tang 58. End 40 has an arcuate notch 60 formed therein. The cutaway portion 54, notch 59, and arcuate notch 60 are formed to increase the flexibility of the sleeve 21.

The sleeve 21 also has an inner surface 23 that defines an interior bore 25. The interior bore 25 is substantially filled with an elastomeric material 24 which is bonded to the inner wall 23. The elastomeric material 24 has an end 61 coinciding with end 42 and another end 62 coinciding with the base of notch 60 as clearly shown in FIG. 8. The elastomeric material 24 forms an axially extending cleft 33. A bolt 26 passes axially through the cleft 33. The bolt 26 has a head 28 at one end thereof and a threaded section 30 at its other end. When the pin assembly 20 is in an unflexed position, as shown in Figure 4, the bolt passes through cleft 33 to form a void 34 between the bolt and the elastomeric material 24. The void 34 has an arcuate cross-section which is dependent upon the distance from the radial center 36. In general, the arcuate width of the void increases by a linear factor of $2\pi$ times the distance from the center 36. The cleft 33 is shaped to assure the linear increase of the void 34 when the bolt 26 is in place.

Referring now to FIGS. 2, 5 and 6, the pin assembly 20 is installed in an aperture 64 formed by opposing slots 66 and 68 within an arm 19 of torque member 14 and a side of caliper 16, respectively. The pin assembly 20 is radially contracted from the position shown in FIG. 4 to a radially contracted second position (i.e., the installed position) shown in FIG. 5. A small force is required to radially contract the sleeve 21 to the installed position. The force is small enough so that a person may flex the end 40 of the sleeve with a pair of pliers. As diagramed in FIG. 9, the resilient rate of the sleeve 21 is the slope of the line 80 between the unflexed first position indicated at 83 and the radially contracted installed position indicated at 84. As shown in FIG. 5, when the pin is in the installed position, the void 34 substantially disappears due to the radial contraction of the elastomeric material 24 about bolt 26.

Tangs 56 and 58 are then deflected toward each other to a position shown in FIG. 6. The tangs are then inserted in slot 66 of torque member 14. The sleeve 21 is then pushed through the aperture 64 until the edge 70 of prong 52 abuts surface 67 of the torque member 14 adjacent slot 66. Simultaneously, the two tangs 56 and 58 exit aperture 64 and flex back to their undeflected position shown in FIG. 5 such that their axial inside edges 73 and 75 abut an opposite surface 69 of torque member 14 adjacent the slot 66. After the tangs 56 and 58 spring back, the sleeve 21 becomes axially fixed within the aperture 64. The nut 32 is then threaded onto the section 30 of bolt 26. As shown in FIGS. 1 and 2, the bolt 26 and nut 32 are off centered in aperture 64 toward the torque member 14 such that the head 28 and nut 32 are in part misaligned from aperture 64.

It should be appreciated that the cutaway portion 54 increases the possible amount of resilient deflection of the tangs 56 and 58. Consequently, the cutaway portion 54 allows the tangs 56 and 58 to be more normal to the cylindrical portion when in their unflexed position than otherwise possible. This increased normality allows surface 69 to abut a greater amount of edges 73 and 75 closer to the cylindrical portion 22. As a result, any axial directed force exerted between the surface 69 and edges 73 and 75 produces a lower moment on tangs 56 and 58 about the respective bases 77 and 79 of each tang shown in FIG. 5.

When the pin assembly is in its installed position within the aperture 64, as shown in FIG. 5, the cylindrical portion 22 abuts walls 90 and 92 of slot 68 and walls 94 and 96 of slot 66. In addition, the shoulder 44 is interposed between the walls 94 and 96 of slot 66 to prevent the sleeve 21 from excessive rotation within the aperture 64. The shoulder 44 is reinforced against lateral deflection by a portion 71 of the elastomeric material 24 interposed between shoulder 44 and bolt 26. Hence, the pin assembly 20 is, hence, rotationally as well as axially fixed within the aperture 64.

As shown in FIGS. 1 and 5, when both pin assemblies 20 are in their installed position, the opposing surfaces 72 and 74 of torque member 14 and caliper 16, respectively, are spaced apart to form a gap 76 therebetween; i.e., the caliper 16 floats between arms 19. If the caliper 16 and torque member 14 undergo a vibration which sets the caliper 16 in lateral motion with respect to the torque member, the caliper moves and contracts one or both of the pin assemblies depending on the lateral direction.

The pin assemblies 20, once installed, remain resiliently contractible, but the resilient rate of each pin assembly 20 becomes large enough to effectively oppose most inertial motion of the caliper 16. The inertial motion of the caliper compresses the pin assembly converting the motion of the caliper into potential energy until the pin assembly halts the motion of the caliper. The contracted pin assembly 20 then forces the caliper back to the floating position shown in FIGS. 1, 2 or 5.

As shown in FIG. 9, the force required to radially contract the pin assembly beyond the installed position as indicated at 84 along the horizontal axis of the graph rapidly rises along line 82. In other words, the resilient rate of contraction is higher when the pin assembly has a radius equal to or smaller than the radius of the installed position as compared to the resilient rate between the unflexed position at 83 and the installed position at 84. The higher resilient rate is maintained until the pin assembly 20 achieves a radially contracted third position indicated at 86 where the caliper 16 abuts the torque member 14. Due to the construction of the disc brake, the pin assembly 20 undergoes no further compression beyond the third position. The high resilient rate is due to the elastomeric material 24 filling void 34 and undergoing compression upon further contraction of the sleeve beyond the installed position. The resilient rate of compression of the elastomeric material 24 is the slope of line 88. The resilient rate of the sleeve 21 is the slope of line 80. The higher resilient rate of the pin assembly is the addition of both rates; i.e., the slope of line 82. Consequently, the amount of energy needed to contract the pin assembly 20 beyond position 84 rapidly increases. Most vibrations between the torque member and caliper do not impart the required energy to the caliper to contract the pin to position 86. As such, the higher resilient rate provides a pin assembly that prevents rattling of the caliper 16 between the two arms 19 of torque member 14.

Upon actuation of the disc brake, the caliper 16 slides on the cylindrical portion 22 of sleeve 21. The caliper 16 does not contact or slide against the torque member 14. Once the friction pads 18 engage the rotor 12, torque is transferred from the rotor via the pads to the caliper 16. The caliper, reacting to the brake torque, forces the sleeve 21 to further radially contract into the position shown in FIG. 7 and as indicated at 86 in FIG. 9 against the resistive resilient force of one pin assembly 20. The pin assembly contracts until the surface 74 of caliper 16 abuts the surface 72 of one arm 19 of torque member 14. The abutment of caliper 16 to arm 19 provides a direct transfer of brake torque from the caliper 16 to the torque member 14, bypassing the pin assembly 20. When the one pin assembly 20 is contracted due to the decreased lateral dimensions of aperture 64, the other pin assembly radially expands as the aperture between the caliper 16 and the other arm 19 has its lateral dimensions increased. When brake torque decreases due to a slowing of rotor 12 or deactuation of the brakes, the contracted pin assembly 20 shown in FIG. 7 radially expands back to its installed position shown in FIG. 5 and moves the caliper 16 back to the floating position shown in FIGS. 1 and 2 against the lower resistive force of the other pin assembly.

Reference now is made to FIGS. 10 and 11 which disclose another embodiment of a pin assembly 20. The pin assembly has an outer spring steel sleeve 121 having a cylindrical portion 122 and an axially extending slit 138. A shoulder 144 runs the full length of the pin 120 from one end 140 to another end 142. A prong 152 extends from the shoulder 144 at the end 142. A tang 156 extends from shoulder 144 at end 140. Elastomeric material 124 is bonded to the interior of the sleeve 121 and has a cleft and receives a bolt to form a void substantially the same as the cleft and void described for the first embodiment when the pin assembly is in an unflexed position.

The sleeve 121 initially has tang 156 bent radially inwardly such that upon contraction of the pin assembly to the installed position, the end 140 can be inserted into the aperture 64 formed between the torque member 14 and caliper 16. Upon exiting the aperture 64, the tang 156 is manually deflected radially outwardly such that surface 69 of the torque member 14 abuts edge 173 of tang 156 and is affixed between the tang 156 and prong 152.

The floating disc brake caliper assembly with the pin assembly according to the invention provides multiple advantages. First, the opposing surfaces 72 and 74 of the torque member 14 and caliper 16 do not need to be machined smooth because these surfaces no longer slide against one another. Instead, the caliper has its walls 90 and 92 of slot 68 slide on the smooth cylindrical portion of the sleeve.

Second, the pin assemblies 20 prevent rattling of the caliper 16 between the two arms 19 of torque member 14. The high resilient rate of the pin assembly, when installed, prevents vibrations of the caliper 16 and torque member 14 from causing the caliper 16 to abut the torque member 14.

Third, the pin assembly does not encounter brake torque. When the caliper 16 is actuated, it laterally moves to radially contract the pin assembly and directly abut the torque member. The brake torque, henceforth, passes directly from the caliper to the torque member bypassing the pin assembly.

Fourth, even though the pin assembly has a high resilient rate in order to prevent rattling of the caliper, it is constructed to have an initial low resilient rate and be easily installed within the aperture. The initial low resilient rate from the unflexed position shown in FIG. 4 to the radially contracted installed position as shown in FIG. 5 is significantly less than the above-identified high resilient rate. The low resilient rate is due substantially to the resilient rate of the sleeve. The elastomeric material does not contribute to the low resilient rate since it merely moves into the void when the pin assembly is contracted from the unflexed position to the installed position. The compression rate of the elastomer only takes effect when the pin assembly is radially contracted beyond the installed position as shown in FIGS. 5 or 11.

Fifth, the invention provides for a durable resilient pin. The pin has an exterior metal sleeve and resilient elastomeric material bonded to the interior portion of the sleeve. The elastomeric material is protected from wear and tear due to axial sliding and lateral movements of the caliper.

Sixth, the cutaway portion 54 in the first embodiment increases the resilient flexibility of tangs 56 and 54 and allows the torque member 14 to abut the tangs 56 and 58 as close to the bases 77 and 79 as possible. The cutaway portion 54 thereby effectively lowers the moment that can be exerted upon the tangs during axial directed forces exerted on the pin assembly.

Seventh, a backup system is provided to retain the pin assembly within the aperture 64. The bolt 26 and nut 32 are misaligned in part from aperture 64 to abut the opposite surfaces 67 and 69 if the sleeve 21 slides within aperture 64.

Eighth, the elastomeric material provides a damper to damp any caliper vibration. Not only does the elastomeric material increase the resilient rate of the pin assembly, it also damps vibration which permits the caliper to be re-centered in its floating position.

Variations and modifications of the present invention are possible without departing from its scope and spirit as defined in the appended claims.

The embodiments of the invention in which an exclusive property or privilege is claimed are defined as follows:

1. A disc brake assembly including a rotor, a torque member positioned adjacent the rotor, a caliper mounting friction elements for engagement with said rotor, and a pin assembly movably supporting said caliper on said torque member; the disc brake assembly characterized by:

said torque member and said caliper having opposing slots forming an aperture for receiving said pin assembly;

said pin assembly including:

a sleeve having a cylindrically shaped portion with an axially extending slit and being resiliently flexible in a radial direction from an unflexed first position to radially contracted second and third positions, said third position being radially smaller than said second position;

said torque member and said caliper having opposing slots forming a noncircular aperture for receiving said pin assembly;

said pin assembly including;

a sleeve having a cylindrical shaped portion with an axially extending slit and being resiliently flexible in a radial direction from an unflexed first position to radially contracted second and third positions;

said sleeve having a shoulder with a first section extending radially from said cylindrical portion of said sleeve and a second section transverse to said first section;

said sleeve having a first end with at least one tang radially extending outward;

said at least one tang being radially movable from a radially inner position to a radially outward position;

said sleeve defining an inside wall bonded to elastomeric material;

said elastomeric material shaped to provide an axially extending void when said sleeve is in a radial position larger than said second position;

said elastomeric material substantially filling said void when said sleeve is in said second position;

said sleeve having said first end sized to fit through said aperture when said sleeve is in approximately said second position and said at least one tang is in its radially inner position;

said sleeve having at its opposite end a prong extending from said shoulder;

said prong and said at least one tang being spaced apart a sufficient distance to engage opposite surfaces of said torque member at opposite axial ends of said aperture; and said at least one tang movable to first position after it exits said aperture to engage said torque member and retain, in conjunction with said prong, said pin assembly axially within said aperture.

* * * * *